(12) United States Patent
Gaber

(10) Patent No.: US 6,487,809 B1
(45) Date of Patent: Dec. 3, 2002

(54) OPTICAL SIGHT SYSTEM WITH WIDE RANGE OF SHOOTING DISTANCES

(75) Inventor: Leonid Gaber, South San Francisco, CA (US)

(73) Assignee: American Technologies Network Corporation (*) Notice: Subject to any disclaimer, the term of this patent is extended or adjusted under 35 U.S.C. 154(b) by 0 days.

(21) Appl. No.: 10/021,646

(22) Filed: Dec. 19, 2001

(51) Int. Cl.[7] .......................... F41A 15/00; G02B 23/00
(52) U.S. Cl. .............................. 42/119; 42/122; 42/123; 33/245; 359/420
(58) Field of Search .................. 42/119, 122, 123; 33/245; 359/419, 420, 821, 428

(56) References Cited

U.S. PATENT DOCUMENTS

| | | | | |
|---|---|---|---|---|
| 1,290,777 A | * | 1/1919 | O'Brien | 359/420 |
| 2,409,186 A | * | 10/1946 | Bouwers | 359/364 |
| 2,512,153 A | * | 6/1950 | Henyey et al. | 359/420 |
| 2,619,874 A | * | 12/1952 | Lane | 359/420 |
| 4,669,833 A | * | 6/1987 | Mise | 359/420 |
| 5,349,469 A | * | 9/1994 | Francis | 359/420 |
| 5,548,442 A | | 8/1996 | Devenyi | 359/432 |
| 5,691,842 A | | 11/1997 | Devenyi | 33/246 |
| 5,924,234 A | | 7/1999 | Bindon et al. | 42/101 |
| 6,226,880 B1 | | 5/2001 | Pitre | 359/432 |

* cited by examiner

Primary Examiner—J. Woodrow Eldred

(57) ABSTRACT

An optical sight system of the invention with a wide range of shooting distances comprises a combination of a telescopic optical sight with a reticle type sight. The reticle sight consists of a partially transparent mirror attached to the outer surface of the telescopic sight at the distal end of the telescopic sight. The telescopic sight supports on its outer surface a light source, which emits a light beam onto the aforementioned partially transparent mirror. The mirror reflects a part of the beam incident on its surface toward a full-reflection mirror attached to the outer surface on the proximal end of the telescopic tube. This mirror is interlocked with the second full-reflection mirror so that when the first full-reflection mirror receives the beam reflected from the semitransparent mirror and carrying the image of the reticle, the second full-reflection mirror closes the eyepiece lens assembly of the telescopic sight and at the same time reflects the image of the target and of the reticle imposed thereupon to the viewer's eye. When it is necessary to use the telescopic sight for aiming at a distant target, the first full-reflection mirror is turned away from the path of the aforementioned beam that carried images of the target and of the reticle, whereas the second full-reflection mirror uncovers the eyepiece lens assembly of the telescopic sight.

28 Claims, 5 Drawing Sheets

OPTICAL SIGHT SYSTEM WITH WIDE RANGE OF SHOOTING DISTANCES

FIELD OF THE INVENTION

The present invention relates to optical sights for weapons, measurement instruments, geological surveying instruments, or the like, and more specifically to optical sights with wide range of observation distances. In particular, the invention relates to a universal optical sight that has a telescopic tube for long-distance viewing or shooting combined with an illuminated-reticle sight for short-distance viewing or shooting.

BACKGROUND OF THE INVENTION

In the last few years the optical sighting technique for firearms and measurement field is characterized by rapid development and sophistication. It is understood that an optical sight would be ideal for use, e.g., on firearms or other weapons, if it could be used for shooting at close as well as at distant targets without disassembling or time-consuming refocusing of optical elements of the sight.

Among a great variety of various telescopic optical sights known in the art, one such sight attachable to a firearm is described, e.g., in U.S. Pat. No. 5,924,234 issued to G. Bindon, et al. in 1999. This is a typical telescopic sight having an objective lens assembly, an eyepiece lens assembly, and an illuminated reticle imposed onto the vision view of the optical sight. If this sight has been focused for aiming at a remote target, but the shooter has to hit a close target, which appeared in his/her field of vision for a very short period of time, the close target can disappear sooner than the shooter would be able to refocus the optical sight. Furthermore, the range of shooting distances inherent in optical telescopic sights is within the limits of from about 30 m to several hundred meters or several kilometers. In general, an optical telescopic sight is not suitable for hitting targets at distances closer than 30 m. Moreover, the use of telescopic sights at short shooting distances is extremely inconvenient because the telescopic optics has a limited aperture, so that only a narrow scene can be observed in the optical sights focused to short distances.

Quite often however, such circumstances are usually accompanied by other difficulties as well. For example, one such circumstance may be a battlefield. Under battlefield conditions it is highly advantageous to have an optical sight that has both a wide field of view and a narrow field of view available to the user. For example, it is quite advantageous for a gunner to be able to select a target over a wide range of distances. Hence, an optical sight having one set of optical elements having a wide field of view, for relatively closer range targets and a second set of optical elements which, when positioned in the optical path of the first set of optical elements, presents a narrow field of view, for relatively distant targets, provides a gunner with the ability to select, track and/or attack targets over a large tactical battlefield.

An attempt to solve the above problem is described in U.S. Pat. No. 5,548,442 issued to G. Devenyi in 1996 and in U.S. Pat. No. 5,691,842 issued to the same inventor in 1997. These patents describe an optical assembly that includes a first plurality of optical elements providing the viewer with a first field of view and a second plurality of optical elements that, when moved into the optical path of the sight, provides the viewer with a second field of view. This is achieved by providing the sight with an optical lens subassembly installed rotatingly inside the sight housing with the axis of rotation transverse to the optical axis of the sight. In one position of the optical lens subassembly the optical axis of this subassembly coincides with the optical axis of the sight and the lenses of the subassembly are included into the optical scheme. This position corresponds to one field of view. When the optical lens subassembly is turned by 90° from the first position to the second position, the lenses of the subassembly are removed from the optical scheme, and the light beams freely pass through the windows provided in the sub-assembly configuration. U.S. Pat. No. 6,226,880 issued in 2001 to R. Pitre describes a quick focusing firearm scope, which includes an elongated tubular scope housing mounted to the upper surface of the firearm barrel. A focusing gear is provided in place of the conventional rotating focusing ring found on conventional scopes. Mounted adjacent to and engaging the focusing gear is a drive gear having a cable attached thereto. The opposing end of the cable extends through a support member that is mounted to the firearm trigger guard. Pivotally attached to the support member is a trigger member having an arcuate gear attached to the upper end thereof that engages a rotary gear on the cable. The lower end of the trigger member includes a loop that receives a shooter's trigger finger. Accordingly, a shooter may quickly focus the scope by pivoting the trigger member with the index finger. This allows a shooter to quickly focus the scope without removing his or her hand from the trigger.

Nevertheless, the device of U.S. Pat. No. 6,226,880 does not solve the problem of switching from distant telescopic sight to a close sight inherent in conventional non-optical rifle sights.

Optical sights intended only for short-distance shooting are known. One such device is described, e.g., in U.S. patent application Ser. No. 09/749982 filed in 2000 by the same applicant as the present patent application. This patent application describes an optical sight for a photocamera or for an aiming device of a firearm, which comprises a combination of a light emitting diode (LED) with a plurality of reticle patterns applied onto the surface of the LED and selectively illuminated by connecting various portions of the reticle pattern to the source of electric power supply. Switching from one pattern to another is carried out electrically without the use of moving the reticles or reticle images. This ensures high accuracy in positioning of reticle elements with regard to each other, e.g., with regard to the front sight center of the partially transparent mirror, and hence, with regard to the ballistic trajectory of the bullet.

More specifically, the aforementioned LED is installed on a mounting plate in the proximal part of the sight and is positioned offset from the optical axis of the sight. The distal part of the mounting plate supports a concave partially transparent mirror through which the viewer can see a target. A special mirror coating passes about 95% of the light and reflects about 5% of the light incident on the mirror. The LED is spaced from the coating of the mirror at a distance equal to half the radius of the curvature on the concave surface of the mirror. The aforementioned reflected part of the light has a shape of a collimated beam. The sight is further provided with an eyepiece, and the mirror coating is arranged so that the beam reflected from the mirror surface is aligned with the axis of the eyepiece. If the beam carries an image (reticle), this image will be localized on the retina of the viewer's eye and will be seen as if it is located in the infinity. The reticle image will be imposed onto the image of a target seen through the partially transparent mirror.

The sight of the aforementioned type is intended for aiming at objects located at short distances, which normally do not exceed 100 meter. The only purpose of this sight is to facilitate aiming by using a virtual illuminated aim (reticle). It is understood that this sight is suitable for aiming only at those objects which are visible with a naked eye and therefore is unsuitable for aiming at remote and poorly visible targets, e.g., dusk or at night time. Another drawback of the sights with an illuminated or virtual sight is inaccuracy of aiming caused by parallax. Parallax is the apparent displacement of an observed object (target), which occurs when the viewer changes his/her position with respect to this object. Parallax is inevitable because in each aiming the viewer's eye assumes different position with respect to the sight. The closer the virtual sight (reticle) to the viewer's eye, the greater is the parallax. That is why rifles allow better aiming and shooting accuracy than guns, which have barrels much shorter than barrels of the guns and therefore closer position of the sight to the viewer than the sight of the rifle.

OBJECTS AND SUMMARY OF THE INVENTION

It is an object of the present invention to provide an optical sight which is simple in construction, inexpensive to manufacture, small in size, suitable for aiming at targets in a wide range of shooting distances without time-consuming replacements or refocusing of optical elements of the sight, suitable for use under combat conditions, does not require substantial reconstruction of an existing telescopic optical sight, can be attached to any existing telescopic sight with simple modification, and, in certain embodiments, suppresses effect of parallax. Another object of the invention is to provide a method of bore-sighting of the sight of the present invention aimed at improvement in the accuracy of shooting.

An optical sight system of the invention with a wide range of shooting distances comprises a combination of a telescopic optical sight with a reticle type sight. In the context of the present invention, the term "reticle-type sight" or "reticle sight" covers any illuminated or non-illuminated reticle for use separately from the telescopic sight with which the aforementioned reticle sight is combined. More specifically, a telescopic optical sight intended for aiming at distant targets has an objective lens assembly on one end and an eyepiece lens assembly on the opposite end. The objective lens assembly and the eyepiece lens assembly are located on a common optical path. Installed on the outer side of the telescopic optical sight is a conventional reticle sight intended for aiming at short distances. The reticle sight consists of a partially transparent mirror attached to the outer surface of the telescopic sight at the distal end of the telescopic sight. The telescopic sight supports on its outer surface a light source, which emits a light beam onto the aforementioned partially transparent mirror. The mirror reflects a part of the beam incident on its surface toward a full-reflection mirror attached to the outer surface on the proximal end of the telescopic tube. This mirror is interlocked with the second full-reflection mirror so that when the first full-reflection mirror receives the beam reflected from the semitransparent mirror and carrying the image of the reticle, the second full-reflection mirror closes the eyepiece lens assembly of the telescopic sight and at the same time reflects the image of the target and of the reticle imposed thereupon to the viewer's eye. When it is necessary to use the telescopic sight for aiming at a distant target, the first full-reflection mirror is turned away from the path of the aforementioned beam that carried images of the target and of the reticle, whereas the second full-reflection mirror, which is interlocked with the first one, uncovers the eyepiece lens assembly of the telescopic sight and thus allows the viewer to see the image of the target only through the telescopic sight. As a result, a viewer either can see the target and image of the reticle only through the reticle sight or can see the target only through the telescopic sight.

DETAILED DESCRIPTION OF THE INVENTION

Figure 1:
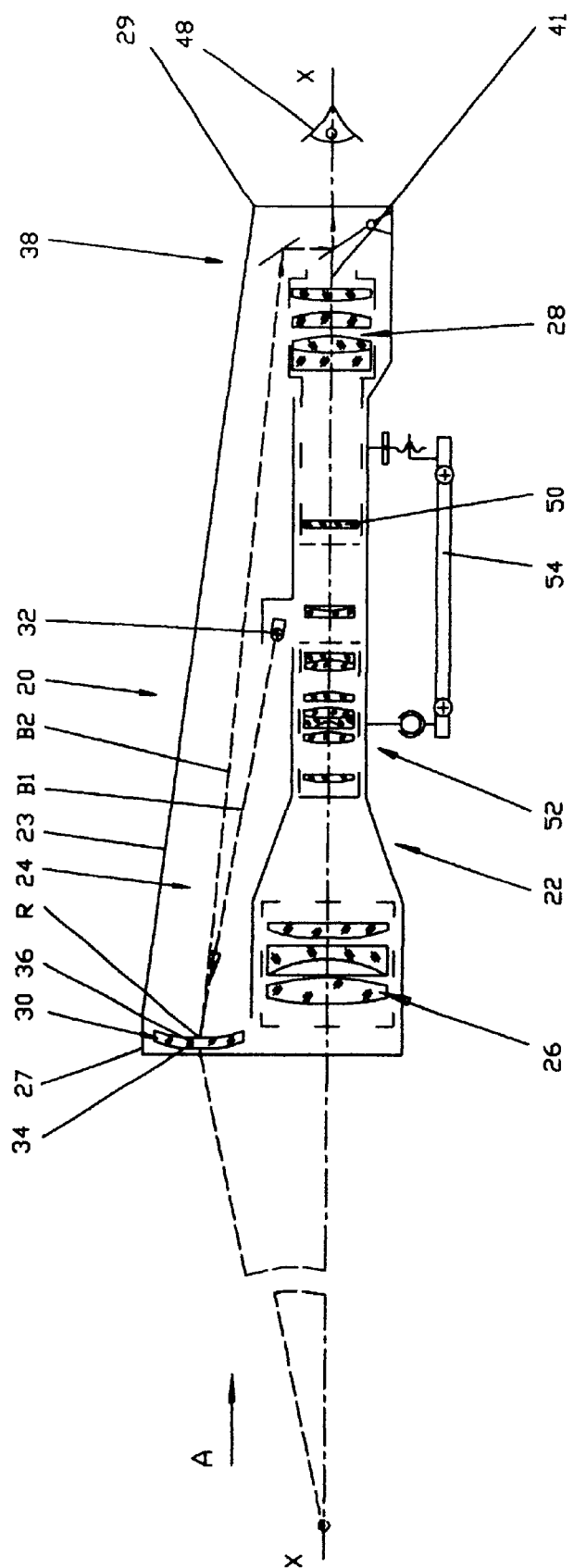
FIG. 1 is a schematic longitudinal sectional view of the optical sight system with a wide range of shooting distances in accordance with the first embodiment of the invention.

A schematic longitudinal sectional view of the optical sight system of the invention with a wide range of shooting distances is shown in FIG. 1. The optical sight of the invention, which in general is designated by reference numeral 20, comprises a combination of a telescopic optical sight 22 with a reticle-type sight 24.

More specifically, a telescopic optical sight 22 intended for aiming at distant targets has an objective lens assembly 26 on a distal end 27 of the telescopic optical sight 22 and an eyepiece lens assembly 28 on the proximal end 29 of the sight 22. The objective lens assembly 26 and the eyepiece lens assembly 28 are located on a common optical path X—X. The reticle sight 24 consists of a partially transparent mirror 30 attached to the outer surface at the distal end 27 of the telescopic sight 22.

The telescopic sight 22 supports a light source 32, e.g., a light emitting diode (LED), which is attached to the outer surface of the telescopic sight 22 and emits a light beam B1 onto the aforementioned partially transparent mirror 30. The projection of the light beam B1 onto the mirror 30 in the form of a light spot R (FIG. 1) is used as an illuminated reticle of the reticle sight. The mirror 30 consists of a transparent substrate 34, e.g., a glass plate, and a thin partially transparent coating 36, e.g., a very thin aluminum film. The aluminum film 36 has a thickness that passes, e.g., about 95% of visible light incident onto the coating and that reflects remaining 5% of the visible light in the form of a reflected beam B2. The thin aluminum film 36, in turn, can be coated with a protective layer (not shown), e.g., of a silicon oxide or a similar protective material which protects the mirror coating 36 from mechanical damage without impairing its optical properties.

The telescopic sight 22 and the reticle sight 24 are enclosed in a common hollow housing 23 and fixed to this housing so that the entire universal sight 20 can be attached to a weapon, or to another device (not shown) for continuous use. Reference numeral 50 designates a conventional reticle of the telescopic sight 22. The reticle 50 may be illuminated.

A light source on the proximal end 29 of the telescopic sight 22 of the invention is a light redirection unit 38, which is attached to the outer surface of the telescopic sight 22 above the eyepiece lens assembly 28. The light redirection unit 38 and its position relative the aperture 41 of the telescopic sight 22 is shown in more detail in FIG. 2, which is a partial sectional view of the beam redirection unit 38. It can be seen from FIG. 2 that the light redirection unit 38 has a full-reflection mirror 40, which is installed on the path of the reflected beam B2 and is inclined at a certain angle to the direction of the reflected beam B2, so that this beam is reflected toward a second full-reflection mirror 43. Upon reflection from the second full-reflection mirror 43, the beam B4 is directed towards the viewer eye 48. The second full-reflection mirror is arranged so that beam B4 coincides with axis X—X.

Figure 2:
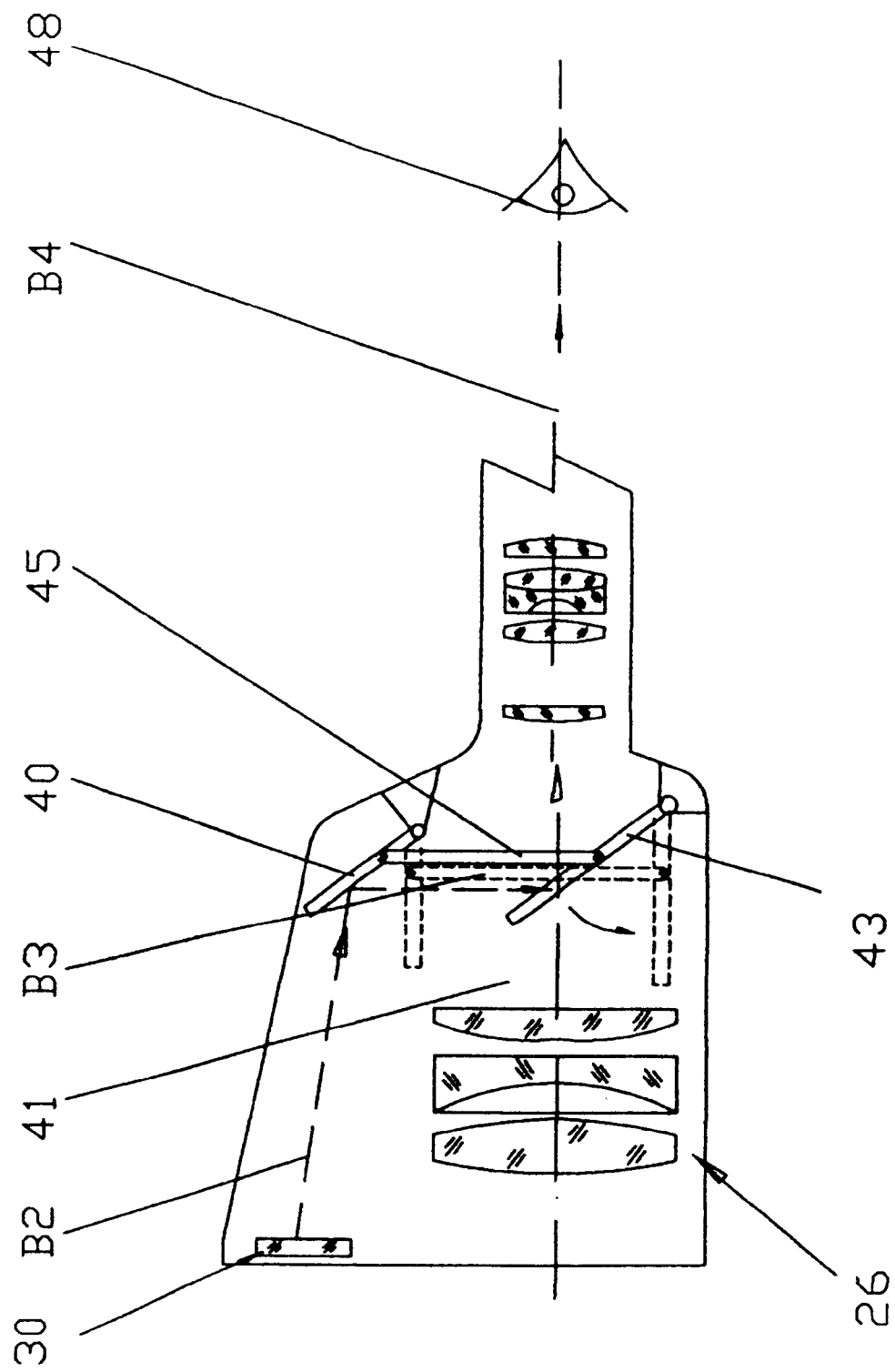
FIG. 2 is a partial sectional view of the beam redirection unit used in the optical sight system of FIG. 1.

As shown in FIG. 2, the full-reflection mirror 40 is interlocked with the second full-reflection mirror 43 through a link 45 pivotally connected to the mirror 43 and to the mirror 40 so that when the first full-reflection mirror 40 receives the beam B2 reflected from the semitransparent mirror 30 (FIG. 1) and carrying the image of the reticle, the second full-reflection mirror 43 closes the eyepiece lens assembly of the telescopic sight 22 and at the same time reflects the image of the target and of the reticle R imposed thereupon to the viewer's eye 48.

When it is necessary to use the telescopic sight 22 for aiming at a distant target, the first full-reflection mirror 40 is turned away from the path of the aforementioned beam B2 that carried images of the target and of the reticle R, whereas the second full-reflection mirror 43, which is interlocked with the first one through the link 45, uncovers the eyepiece lens assembly 41 of the telescopic sight 22 and thus allows the viewer to see the image of the target only through the telescopic sight 22. As a result, a viewer can see either the target and image of the reticle R only through the reticle sight 24 or an image of the target and the reticle 50 through the telescopic sight 22. Reference numeral 52 designates an image inverter located between the objective lens assembly 26 and the eyepiece lens assembly 28.

Figure 3:
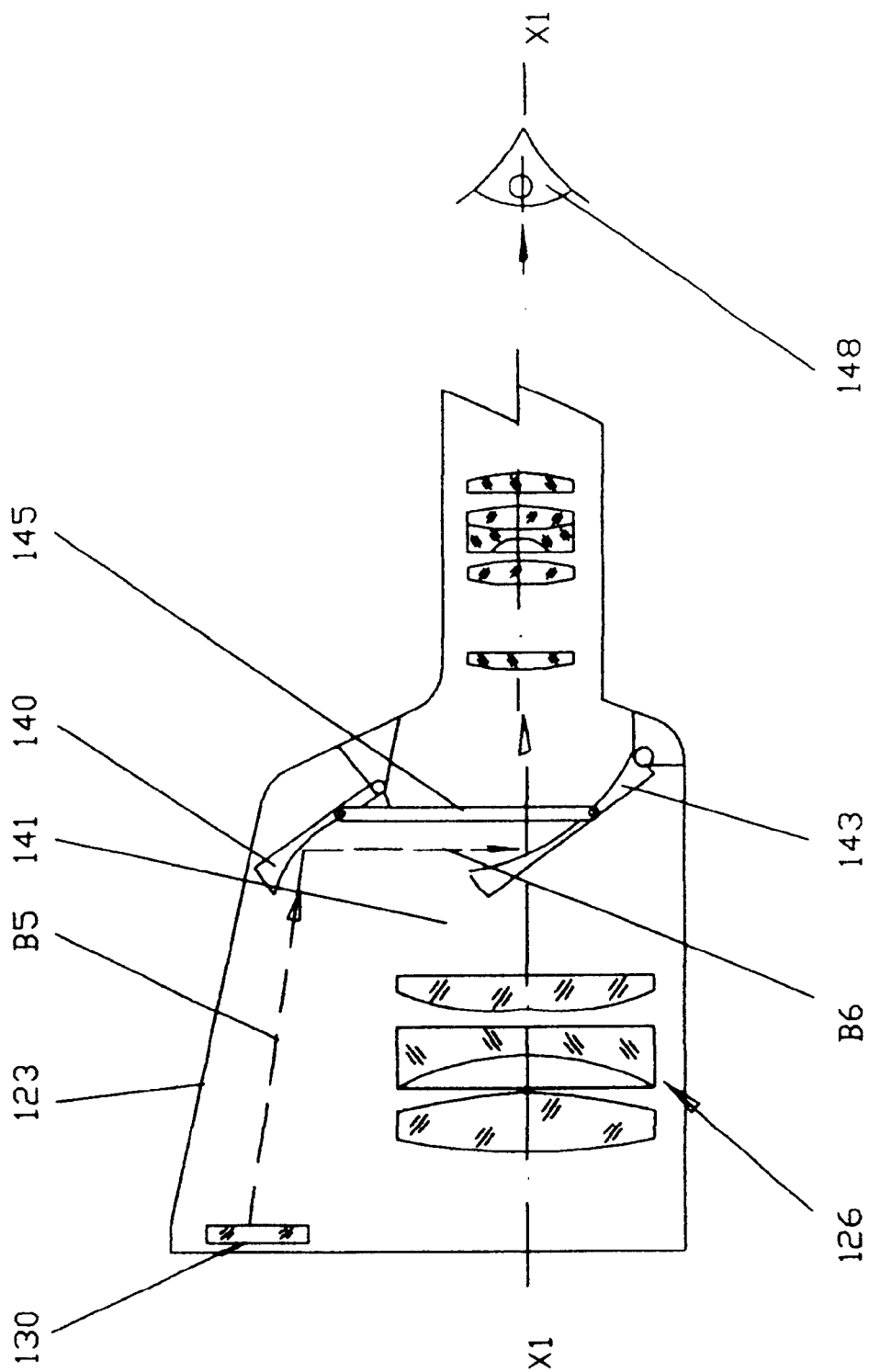
FIG. 3 is a partial sectional view of the universal sight made in accordance with the second embodiment of the present invention and aimed at a decrease of the effect of parallax on accuracy of shooting.

FIG. 3 is a partial sectional view of the universal sight made in accordance with another embodiment of the present invention. This embodiment is aimed at suppression of the undesired parallax. As the sight of this embodiment is substantially the same as the previous one, the parts of the second embodiment similar to those of the embodiment of FIG. 1 will be designated by the same reference numerals with an addition of 100. As shown in FIG. 3, the first full-reflection mirror 140 of the beam redirection unit 138 is made concave. If necessary, the second full-reflection mirror 143 also can be made concave, although the use of a single concave mirror is sufficient. The curvature of the mirror 140 or 143, or both is selected so that the viewer's eye 148 sees the image of the reticle R (FIG. 1) at a distance remote from the distal end 27 of the sight 24. In other words, the image of the virtual reticle R is moved closer to the target, whereby the parallax angle is reduced and to a lesser degree depends on the position of the viewer's eye relative to the sight 24.

Figure 4:
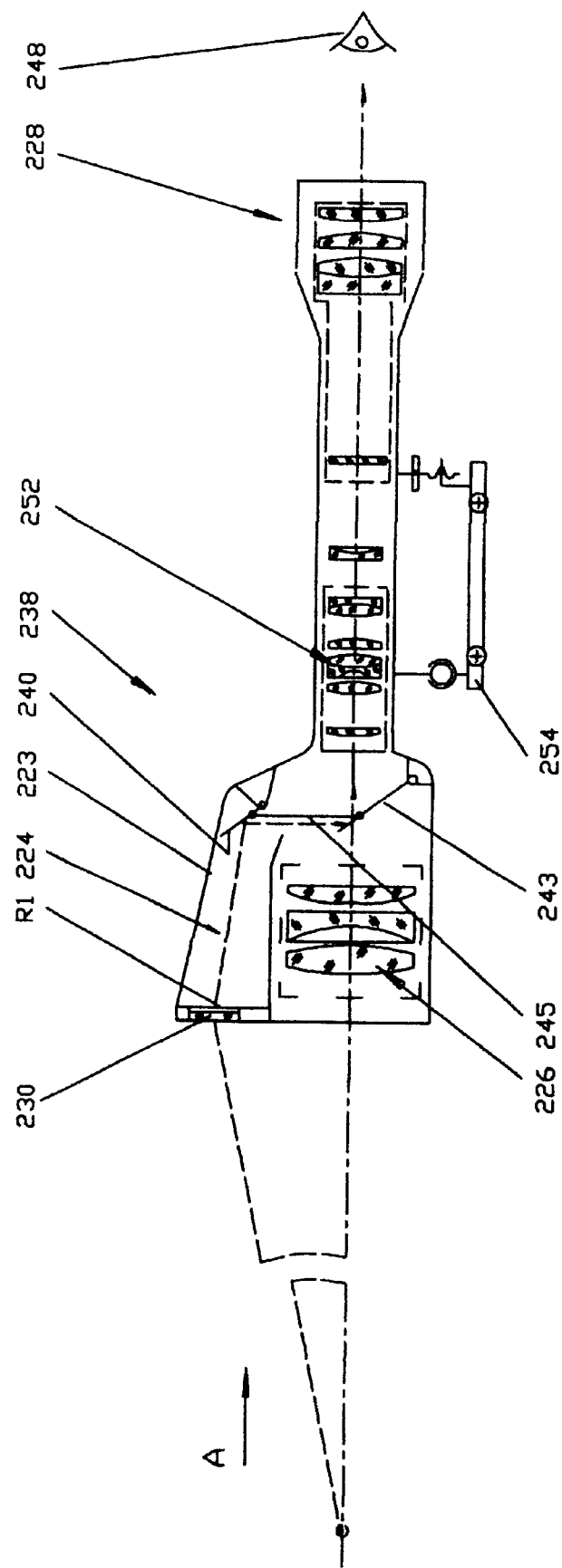
FIG. 4 is a schematic longitudinal sectional view of the universal sight made in accordance with the third embodiment of the present invention and aimed at a decrease of the effect of parallax on accuracy of shooting.

FIG. 4 is a schematic longitudinal sectional view of the universal sight made in accordance with the third embodiment of the present invention. This embodiment is also aimed at suppression of the undesired parallax. As the sight of this embodiment is substantially the same the sights of the previous embodiments, the parts of the third embodiment similar to those of the embodiments of FIGS. 1–3 will be designated by the same reference numerals with an addition of 200. Only those features of the embodiment of FIG. 4, which are different from the previous embodiments, will be described.

A light-redirection unit 238 is located between the image inverter 252 and an objective lens assembly 226. The mechanism for rotating interlocked full-reflection mirrors 240 and 243 is the same as the one shown in FIG. 2 with flat mirrors. The mirrors 240 and 243 are interlocked via a pivotal link 245. The image of the virtual reticle R1 is seen by the viewer's eye 248 at a remote distance due to the fact that the image of the reticle R1 is seen through the eyepiece lens assembly 228, which in this embodiment is common for both the reticle sight 224 and the telescopic sight 22. As the image of the virtual reticle R1 is moved closer to the target, the parallax angle is reduced and to a lesser degree depends on the position of the viewer's eye relative to the sight 224.

Figure 5:
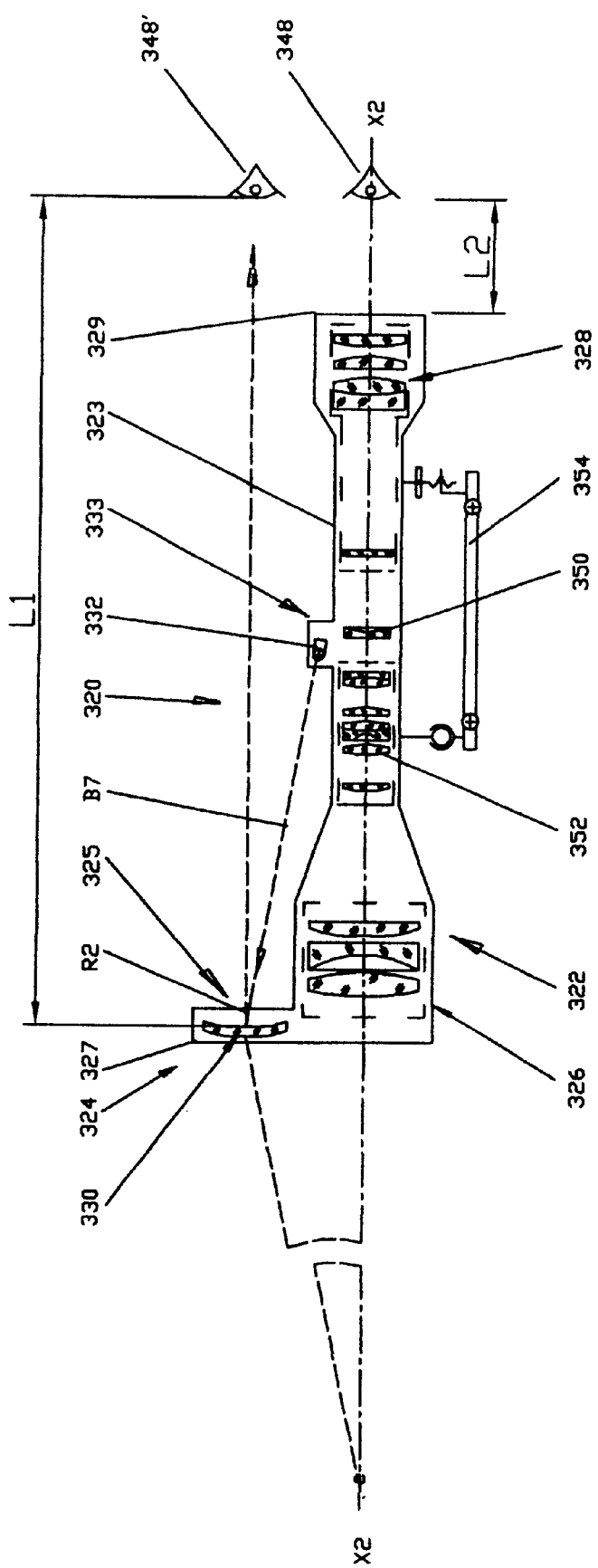
FIG. 5 is a longitudinal sectional view of view of the universal sight made in accordance with the fourth embodiment of the present invention aimed at simplification of the sight construction.

FIG. 5 is a longitudinal sectional view of the universal sight made in accordance with the fourth embodiment of the present invention. This embodiment is a simplified version of the universal reticle-telescopic sight. As the sight of this embodiment is similar to the sights of the previous embodiments, the parts of the third embodiment identical to those of the embodiments of FIGS. 1–4 will be designated by the same reference numerals with an addition of 300. Only those features of the embodiment of FIG. 5, which are different from the previous embodiments, will be described.

A universal reticle-telescopic sight 320 of this embodiment has a reticle sight 322 which consists merely of a partially transparent mirror 330 and a light source 332 that forms a light spot or virtual reticle R2 on the surface of the mirror 330. The mirror 330, the light source 332, and all parts of the telescopic sight 322, i.e., the objective lens assembly 326, the image inverter 352, and the eyepiece lens assembly are enclosed in a common housing 323. As can be seen from FIG. 5, on its distal end 327, the hollow housing 323 has a hollow radial projection 325, which accommodates the aforementioned mirror 330, whereas another radial projection formed between the distal end 327, and the proximal end 329 accommodates the light source 332. The facing sides of the projection 325 and of the projection 333 may have windows (not shown) for passing of the light beam B7 from the light source 332 to the mirror 330. The reticle sight 324 does not have a beam-redirection unit, and when the viewer aims the weapon (not shown) at the target (not shown) through the reticle sight 324, he/she is looking directly at the mirror 330 and aims at the target by aligning the image of the reticle R2 with the image of the target. When it is necessary to use the telescopic sight 322, the viewer simply changes position of the eye from 348' to position 348 and aims via the eyepiece lens assembly 328.

An advantage of the embodiment of the sight of the invention shown in FIG. 5 consists in that a distance L1 from the viewer's eye to the first optical element of the reticle sight 324 is not limited in the sense that the viewer's eye can be positioned at any distance from the mirror 330. For comparison, it can be seen that the distance L2 from the viewer's eye to end of the eyepiece lens assembly 328 is limited, normally to 3–5 inches.

In order to suppress the undesired effect of parallax, the reticle mirror 330 can be made concave with the curvature required for moving the image of the reticle R2 closer to the target.

In order to improve accuracy of aiming, the sights of all embodiments shown in FIGS. 1 through 5, can be mutually preset at a factory. The factory setting procedure is performed for the reticle sight and for the telescopic sight, so that both sights are fixed within the common housing only after the results of adjustment of the reticle sight coincides with those obtained for the telescopic sight. Once the relative positions of the reticle sight and the telescopic sight are fixed, the universal sight can be bore-sighted as a whole with the use of a common a windage/elevation mechanism 354 shown schematically in FIG. 5. Thus it has been shown that the present invention provides an optical sight which is simple in construction, inexpensive to manufacture, small in size, suitable for aiming at targets in a wide range of shooting distances without time-consuming replacements or refocusing of optical elements of the sight, suitable for use under combat conditions, does not require substantial reconstruction of an existing telescopic optical sight, can be attached to any existing telescopic sight with simple modification, and, in certain embodiments, suppresses effect of parallax. The invention also provides a method of bore-sighting of the sight of the present invention aimed at improvement in the accuracy of shooting. Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, one and the same light source can be used for illumination of both the virtual reticle of the reticle sight unit and the conventional reticle of the telescopic sight unit. The reticle sight unit and the beam-redirection unit may have a foldable construction and can be folded onto the housing of the telescopic sight when the reticle sight is not in use. The universal sight of the invention can be bore-sighted at a factory and matched and permanently attached to the weapon or to another respective device or may have a detachable construction with the reticle sight bore-sighted at a factory only relative to the telescopic sight. The housings of the universal sights of the invention may have shapes different from those shown in the drawings and can be made from different materials. If necessary, the sight system of the invention can be combined with laser aiming devices, which facilitate aiming under poor vision conditions. In a most simplified form the sight of the invention may comprise a simple non-illuminated reticle attached to the outer surface of the telescopic sight. The reticle can be illuminated not necessary by the light beam emitted from a light source and, if necessary, the reticle can be illuminated with the incandescent light caused by glow discharge of a thin conductor that forms the reticle.

What I claim is:

1. An optical sight system with a wide range of shooting distances comprising:

a hollow housing having a proximal end and a distal end;

an optical telescopic sight located in said hollow housing and having an objective lens assembly at said distal end and an eyepiece lens assembly at said proximal end, said optical telescopic sight having an optical axis which is common for said objective lens assembly and said eyepiece lens assembly; and a reticle sight with an illuminated reticle attached to said housing and located on an optical axis different from said common optical axis, said reticle sight further comprising a light source, said illuminated reticle being illuminated by a light beam emitted from said light source, said hollow housing having a first hollow radial projection on said distal end and a second hollow radial projection between said distal end and said proximal end, said first hollow radial projection accommodating said illuminated reticle, and said second radial projection accommodating said light source.

2. The optical sight of claim 1, wherein said illuminated reticle of said reticle sight comprises a semi-transparent mirror that passes the light that carries an image of a target to the viewer's eye but reflects said light beam emitted from said light source.

3. The optical sight of claim 2, wherein said semi-transparent mirror is a concave mirror having a concave surface facing said light beam emitted from said light source, said concave mirror reflecting said light beam emitted from said light source incident onto said concave mirror in a direction substantially parallel to said common optical axis.

4. The optical sight of claim 3, wherein said optical sight is intended for aiming at a target, said concave mirror has a curvature that reproduces a virtual image of said illuminated reticle in a position located beyond said distal end and approached to said target.

5. The optical sight of claim, 2, wherein said reticle sight and said light source are located in said hollow housing, said optical sight being further provided with a beam-redirection unit located in said hollow housing, said eyepiece lens assembly being common for said reticle sight and for said optical telescopic sight, said beam-redirection unit being installed on a path of a light beam reflected from said semi-transparent mirror.

6. The optical sight of claim 5, wherein said beam redirection unit has means for excluding simultaneous use of said reticle sight and of said optical telescopic sight.

7. The optical sight of claim 6, wherein said illuminated reticle of said reticle sight comprises a semi-transparent mirror that passes the light that carries an image of a target to the viewer's eye but reflects said light beam emitted from said light source.

8. The optical sight of claim 7, wherein said means for excluding simultaneous use of said reticle sight and of said optical telescopic sight comprises a first pivotally-installed full-reflection mirror and a second pivotally-installed full-reflection mirror which is interlocked with said first pivotally-installed full-reflection mirror via an interlocking link, said first pivotally-installed full-reflection mirror and said second pivotally-installed full-reflection mirror being rotated between a first position in which said first pivotally-installed full reflection mirror interrupts the beam directed from said reticle sight to said eyepiece lens assembly, while said second full-reflection mirror passes the beam directed from said optical telescopic sight to said eyepiece assembly, and a second position in which said first pivotally-installed full-reflection mirror passes the beam directed from said reticle sight, while said second full-reflection mirror interrupts the beam directed from said optical telescopic sight to said eyepiece assembly.

9. The optical sight of claim 8, wherein said interlocking link is a link member pivotally connected to said first full-reflection mirror and pivotally connected to said second full-reflection mirror.

10. The optical sight of claim 8, wherein said semi-transparent mirror is a concave mirror having a concave surface facing said light beam emitted from said light source, said concave mirror reflecting said light beam emitted from said light source incident onto said concave mirror in a direction substantially parallel to said common optical axis.

11. The optical sight of claim 10, wherein said optical sight is intended for aiming at a target, said concave mirror has a curvature that reproduces a virtual image of said illuminated reticle in a position located beyond said distal end and approached to said target.

12. The optical sight of claim 8, wherein at least one of said first pivotally-installed full-reflection mirror and said second pivotally-installed full-reflection mirror is a concave mirror.

13. The optical sight of claim 1, wherein said optical telescopic sight having a telescopic sight reticle and an image inverter unit installed on said common optical axis between said objective lens assembly and said eyepiece lens assembly.

14. The optical sight of claim 2, wherein said optical telescopic sight has a telescopic sight reticle and an image inverter unit installed on said common optical axis between said objective lens assembly and said eyepiece lens assembly.

15. An optical sight system with a wide range of shooting distances comprising:

a hollow housing having a proximal end and a distal end;

an optical telescopic sight located in said hollow housing and having an objective lens assembly at said distal end and an eyepiece lens assembly at said proximal end, said optical telescopic sight having an optical axis which is common for said objective lens assembly and said eyepiece lens assembly; and a reticle sight with an illuminated reticle attached to said housing and located on an optical axis different from said common optical axis, said reticle sight and said optical telescopic sight being mutually preset at a factory so that both said sights are fixed within said common housing only after the results of adjustment of said coincides with results of adjustment of said the optical telescopic sight with deviations of said both results within allowed limits, said optical sight being further provided with a windage/elevation mechanism for common bore-sighting of said optical telescopic sight and said reticle sight as a whole; said reticle sight further comprising a light source, said illuminated reticle being illuminated by a light beam emitted from said light source, said hollow housing having a first hollow radial projection on said distal end and a second hollow radial projection between said distal end and said proximal end, said first hollow radial projection accommodating said illuminated reticle, and said second radial projection accommodating said light source.

16. The optical sight of claim 15, wherein said illuminated reticle of said reticle sight comprises a semi-transparent mirror that passes the light that carries an image of a target to the viewer's eye but reflects said light beam emitted from said light source.

17. The optical sight of claim 16, wherein said semi-transparent mirror is a concave mirror having a concave surface facing said light beam emitted from said light source, said concave mirror reflecting said light beam emitted from said light source incident onto said concave mirror in a direction substantially parallel to said common optical axis.

18. The optical sight of claim 17, wherein said optical sight is intended for aiming at a target, said concave mirror has a curvature that reproduces a virtual image of said illuminated reticle in a position located beyond said distal end and approached to said target.

19. The optical sight of claim 15, wherein said reticle sight and said light source are located in said hollow housing, said optical sight being further provided with a beam-redirection unit located in said hollow housing, said eyepiece lens assembly being common for said reticle sight and for said optical telescopic sight, said beam-redirection unit being installed on a path of a light beam reflected from said semi-transparent mirror.

20. The optical sight of claim 19, wherein said beam redirection unit has means for excluding simultaneous use of said reticle sight and of said optical telescopic sight.

21. The optical sight of claim 20, wherein said illuminated reticle of said reticle sight comprises a semi-transparent mirror that passes the light that carries an image of a target to the viewer's eye but reflects said light beam emitted from said light source.

22. The optical sight of claim 21, wherein said means for excluding simultaneous use of said reticle sight and of said optical telescopic sight comprises a first pivotally-installed full-reflection mirror and a second pivotally-installed full-reflection mirror which is interlocked with said first pivotally-installed full-reflection mirror via an interlocking link, said first pivotally-installed full-reflection mirror and said second pivotally-installed full-reflection mirror being rotated between a first position in which said first pivotally-installed full reflection mirror interrupts the beam directed from said reticle sight to said eyepiece lens assembly, while said second full-reflection mirror passes the beam directed from said optical telescopic sight to said eyepiece assembly, and a second position in which said first pivotally-installed full-reflection mirror passes the beam directed from said reticle sight, while said second full-reflection mirror interrupts the beam directed from said optical telescopic sight to said eyepiece assembly.

23. The optical sight of claim 22, wherein said interlocking link is a link member pivotally connected to said first full-reflection mirror and pivotally connected to said second full-reflection mirror.

24. The optical sight of claim 22, wherein said semi-transparent mirror is a concave mirror having a concave surface facing said light beam emitted from said light source, said concave mirror reflecting said light beam emitted from said light source incident onto said concave mirror in a direction substantially parallel to said common optical axis.

25. The optical sight of claim 24, wherein said optical sight is intended for aiming at a target, said concave mirror has a curvature that reproduces a virtual image of said illuminated reticle in a position located beyond said distal end and approached to said target.

26. The optical sight of claim 22, wherein at least one of said first pivotally-installed full-reflection mirror and said second pivotally-installed full-reflection mirror is a concave mirror.

27. The optical sight of claim 15, wherein said optical telescopic sight having a telescopic sight reticle and an image inverter unit installed on said common optical axis between said objective lens assembly and said eyepiece lens assembly.

28. The optical sight of claim 19, wherein said optical telescopic sight has a telescopic sight reticle and an image inverter unit installed on said common optical axis between said objective lens assembly and said eyepiece lens assembly.

* * * * *